(12) United States Patent
Edwards et al.

(10) Patent No.: US 10,826,633 B2
(45) Date of Patent: Nov. 3, 2020

(54) SYSTEM AND METHOD FOR THE BROADCAST TRANSMISSION OF DIGITAL VIDEO OVER TERRESTRIAL FREQUENCY MODULATED WIRELESS MEDIUM

(71) Applicant: Nu Lightwave Logic LLC, Sicklerville, NJ (US)

(72) Inventors: Charles A. Edwards, Sicklerville, NJ (US); Robert B. Beck, Atlantic City, NJ (US); Kenneth O. C. Edwards, Egg Harbor Township, NJ (US); Charles E. Dunn, Las Vegas, NV (US); Guiffre M. Hollingsworth

(73) Assignee: Nu Lightwave Logic LLC, Sicklerville, NJ (US)

( * ) Notice: Subject to any disclaimer, the term of this patent is extended or adjusted under 35 U.S.C. 154(b) by 282 days.

(21) Appl. No.: 15/329,765

(22) PCT Filed: Jul. 29, 2015

(86) PCT No.: PCT/US2015/042567
§ 371 (c)(1),
(2) Date: Jan. 27, 2017

(87) PCT Pub. No.: WO2016/018971
PCT Pub. Date: Feb. 4, 2016

(65) Prior Publication Data
US 2017/0222742 A1    Aug. 3, 2017

Related U.S. Application Data

(60) Provisional application No. 62/030,887, filed on Jul. 30, 2014.

(51) Int. Cl.
*H04L 29/08* (2006.01)
*H04H 20/95* (2008.01)
(Continued)

(52) U.S. Cl.
CPC ............ *H04H 20/95* (2013.01); *H04H 20/71* (2013.01); *H04L 67/20* (2013.01);
(Continued)

(58) Field of Classification Search
CPC ..... H04L 67/20; H04L 67/2804; H04H 20/30; H04H 20/71; H04H 20/95; H04H 2201/18;
(Continued)

(56) References Cited

U.S. PATENT DOCUMENTS 8,111,716 B2   2/2012  Iannuzzelli et al.
8,144,612 B2   3/2012  Johnson et al.
(Continued)

FOREIGN PATENT DOCUMENTS

WO    2011044349 A1    4/2011

*Primary Examiner* — Jungwon Chang
(74) *Attorney, Agent, or Firm* — Price Heneveld LLP (57) ABSTRACT

The present invention provides systems and methods that enable the delivery of rich digital content over terrestrial base frequency modulated broadcast systems. The digitally rich content may include, but not limited to live or recorded video, command and control information. Access to the content may be on a free, pay-per-use, pay-per-view, or pay-per-broadcast or multicast method.

6 Claims, 5 Drawing Sheets

(51) Int. Cl.
*H04H 20/71* (2008.01)
*H04N 21/237* (2011.01)
*H04N 21/61* (2011.01)
*H04H 20/30* (2008.01)

(52) U.S. Cl.
CPC ....... *H04L 67/2804* (2013.01); *H04N 21/237* (2013.01); *H04N 21/6112* (2013.01); *H04H 20/30* (2013.01); *H04H 2201/18* (2013.01)

(58) Field of Classification Search
CPC .... H04H 60/11; H04N 5/4401; H04N 21/237; H04N 21/6112; H04B 1/20; H04W 4/90
See application file for complete search history.

(56) References Cited

U.S. PATENT DOCUMENTS

| | | | |
|---|---|---|---|
| 8,230,343 B2 | 7/2012 | Logan et al. | |
| 2006/0174306 A1* | 8/2006 | Kim | H04N 5/4401 725/132 |
| 2007/0223535 A1* | 9/2007 | Hamazaki | H04H 60/11 370/486 |
| 2009/0247116 A1* | 10/2009 | Sennett | H04W 4/90 455/404.2 |
| 2009/0300508 A1* | 12/2009 | Krampf | H04B 1/20 715/739 |
| 2010/0265398 A1 | 10/2010 | Johnson et al. | |
| 2011/0090897 A1* | 4/2011 | Johnson | H04H 20/30 370/350 |
| 2011/0202270 A1* | 8/2011 | Sharma | G06Q 30/02 701/533 |

* cited by examiner

SYSTEM AND METHOD FOR THE BROADCAST TRANSMISSION OF DIGITAL VIDEO OVER TERRESTRIAL FREQUENCY MODULATED WIRELESS MEDIUM

CROSS-REFERENCE TO RELATED APPLICATION

This patent application is a national stage entry under 35 U.S.C. § 371 of International Application No. PCT/US2015/042567 filed on Jul. 29, 2015, which claims priority under 35 U.S.C. § 119(e) to U.S. Provisional Patent Application No. 62/030,887, filed Jul. 30, 2014, entitled "SYSTEM AND METHOD FOR THE BROADCAST TRANSMISSION OF DIGITAL VIDEO OVER TERRESTRIAL FREQUENCY MODULATED WIRELESS MEDIUM."

FIELD OF THE INVENTION

The present invention relates generally to the ability to transmit digitally rich content, such as video data over terrestrial based frequency modulated broadcast medium, also universally known as FM Radio.

BACKGROUND OF THE INVENTION

Field of Invention

The present invention relates to enhancements of communications technology used for the enablement of broadcasting digitally rendered video and audio data, and more particularly, to the communications over FM Radio channels that were previously relegated to audio only reception.

Description of Related Art

Communicating information over wireless technologies is not a new phenomenon. In fact it predates the use of radio transmissions to communicate audio. In ancient times, smoke signals and/or drums were used to communicate information over long distances and battlefields. However it wasn't until the late 1800s and early 1900s, did the work of many notable individuals such as Reginald Fessenden, Thomas Edison, Heinrich Rudolf Hertz, Guglielmo Marconi, Nikola Tesla, et al, enabled communications to cover vast areas of the earth using electromagnetic wireless technologies. Initially there work culminated in advent of radio (wireless) telegraphy. While the communications of data was an invaluable advancement, at the end of 1900, Fessenden successfully achieved the first speech transmission or audio communications over radio waves, ushering in the birth of the radio broadcast industry. By the mid to late 1920s many business interests began the effort to form broadcasting enterprises, many of which are still operating today. By 1930 almost six out of every ten households in American had a "radio" (audio wireless receiver).

During the late 1920s and early 1930s another notable inventor, Edwin Armstrong began trying to solve problems regarding the quality of the audio signal that was being received. By 1933, Armstrong had successfully developed and patented wide-band frequency modulation techniques that helped mitigate much of the noise that was prevalent in audio receivers of the day. His invention was the basis for the development of high quality FM radio that we all enjoy today.

During the same period of time, inventors were also working on transmitting copies of moving images over electromagnetic waves. While initial television set designs were electromechanical in nature, by the late 1930s and early 1940s electronic base systems were becoming commercially available and standards were being formalized. By the mid-1950s close to 60% of American households owned a television set.

For the next 40 years, the broadcast industry made great leaps at delivering content (e.g., music (audio), video (moving images)) using wireless technologies. While radio and television transmissions are based on the same analog fundamentals of radio communications waves/carriers, the two mediums have served different purposes. In fact, even though simulcasting the audio portion of a broadcast is technically feasible and has been accomplished in the past, few events are ever "aired" in this manner.

As wireless communications technologies continued to evolve along with the processing speed of computers, during the late 1980s and early 1990s, inventors began to study how to communicate audio and video content digitally over these same analog wireless carriers. In fact, television quality was beginning a renascence with the rise of digital compression technology. Previous attempts at delivering high definition television (HD-TV) using existing analog technology proved to be difficult, thus not economically feasible. As digital sampling rates and computational power increased, the possibility of communicating higher quality television became a reality, ultimately requiring less spectrum to broadcast the signal. Upon reception, the receivers would decompress the video and audio signals for a drastically improved picture and sound quality. This improvement did not come without cost as all broadcasting equipment and television receivers had to be upgraded to take advantage of the new capabilities. As an extra benefit, at least in the United States, upgrading to the new scheme also reduced the amount of wireless spectrum needed to transmit television signals, even though there are more potential channels. The recovered television frequencies are primarily in the upper ultra high frequency (UHF) 700 megahertz band.

In addition to these improvements, during the 1970s, television content delivery took a major turn into space. While satellites had been used by governments and broadcasting conglomerates to beam television signals around the earth for a number of years, direct-to-consumer delivery was non-existent. In fact, it wasn't until late 1979 that the Federal Communications Commission began to allow the operation of home satellite earth stations without a license. Throughout the next three decades, improvements in communications and compression technologies allows full content providers to economically deliver television even to rural areas not feasibly reachable by traditional terrestrial means. Furthermore, receiving antenna or parabolic dish size has shrunk to less than a meter in diameter, far from the four to five meter C-Band dishes that were initially associated with satellite reception. Similar to the HDTV phenomenon, initially signals were using analog standards, then eventually migrated to digitally compressed content as computational power increased.

Unlike TV, at least in the United States, the FM radio industry has been slow to adopt wholesale upgrading of technology. While there are multiple standards for digitally transmitting audio content, for instance, Digital Audio Broadcasting (DAB aka Eureka 147, DAB+, etc.), the sheer number of receivers that would have to be replaced is significantly higher than the millions and millions of television sets. One must consider all the FM radios that have been installed in vehicles since the late 1950s and the billions of FM radio receiver devices (transistorized radios, phones, headsets, computers, etc.) that have been manufactured. Also given the seismic decline away from listening to regional broadcast radio by younger generations due to the advent of MP3 players, file sharing, and streaming audio/video content over the so called Internet broadcast services as Pandora, Slacker, Spotify, etc., reducing access to existing FM radio broadcast content is probably not economically attractive or lucrative to broadcast organizations.

To resolve some of these problems, technologists have designed a solution known as In-Band-On-Channel (IBOC), pioneered by iBiquity Digital Corporation. iBiquity's solution allows it to run in a hybrid mode, enabling broadcasters to continue to serve the already entrenched analog market place, while offering updated services to digitally capable receivers. iBiquity markets this solution under the HD Radio™ trademark, even though it bears no relationship to HDTV technology.

The FM hybrid digital/analog solution offers different modes of operation, which can broadcast between 5 and 150 kilobits of loss-full data depending upon the station power budget and/or desired range of signal. Using these modes of operations, FM stations have the ability to subdivide audio/data into distinct sub-channels (e.g., 88.1 HD1, HD2, HD3) of varying audio quality over the same frequency range. When operating in this manner, the station has its full ±100 kHz of analog bandwidth with a ±30 kHz guard band leaving ±70 kHz for its digital signals, thus utilizing the full 200 kHz of spectrum allocated by the FCC. Additionally, stations can transmit HD Radio through their existing antennas, or are permitted by the FCC to use a separate antenna at the same location, or at a site licensed as an analog auxiliary, provided it is within a certain distance and height referenced to the analog main signal.

According to iBiquity, at the time of this writing, nearly 2000 stations across the United States have embraced their technology. However while the number of people listening to FM radio has remained mostly static for the past decade, according to one 2013 report[1]:

[1] Pew Research Center's The State of the News Media 2013 http://stateofthemedia.org/2013/audio-digital-drives-listener-experience/audio-by-the-numbers/

"While new digital options grew audience, AM/FM's beleaguered attempt to draw people back to radio— through HD—did worse than ever. For the first time since 2004, when HD radio receivers became available for retail sale, more radio stations dropped their HD signal than adopted the technology."

This fact does not bode well for a smooth transition to the more efficient digital broadcasting technologies.

In light of the above outlined limitations and apparent loss of market share of currently available solutions, it would be highly desirable to be able to deliver richer content over the digital FM radio communications path. In one non-limiting illustrative embodiment, richer content may include the delivery of streaming video, pay-per-view or pay-per broadcast events, music video, public safety/service information, advertising content, social media feeds, as well as potential control messages via the FM broadcast medium. In another non-limiting illustrative embodiment, the richer content may be delivered in connection with the use of traditional data networks such as the Internet as an alternative off-loading technique. This innovation could aid in reducing the downstream bandwidth requirements over wired/wireless data networks such as fiber, cellular, or satellite. Using the FM digital channel for command communications could provide an easy way to communicate with sensor/embedded compute and control devices or Internet of Things (IOT) devices, thus reducing the cost and bandwidth requirements for data communications with these devices. As a non-limiting example, consider that many municipalities are already using radio transponders for traffic notification systems. In some instances tuning to a specific radio station currently allows one to hear local status updates about roadway and weather conditions. Being able to provide up to the minute video without requiring a cellular connection about changing conditions would significantly improve the usefulness of these systems. Alternatively, as another example, some organizations are using cellular communications to turn on and off systems such as bridge deicing equipment. Being able to send these control signals over FM channels already operated by the same governmental or commercial agencies would reduce the cost of data communications with these types of devices. If combined with cellular radio, the cellular radio may only be used to report status information for the device, or as a more expensive backup to the FM transmissions.

The present invention can also enable the development of new innovated services that can provide for interactive programing, where content is regionally broadcast to digital FM receivers, and the consumer has the ability to provide feedback on that content over a secondary data network channel. Also consider such content providers such as ESPN, HBO, NetFlix etc. may now partner with regional FM stations to broadcast their content, enabling closer distribution to their subscribers, thus achieving a local "Fast Lane" for their content.

SUMMARY OF THE INVENTION

The present invention provides systems and methods for the broadcast of rich content over frequency modulated (FM) terrestrial digital communications.

HD Radio™ is a system and method that allows for the delivery of digital data over recently unusable wireless spectrum. With the improvements of the present invention, enhanced content and control information can be delivered to edge node devices capable of receiving HD Radio™ transmissions.

Aspects of the inventions also provide for the conversion of streaming content such as video to a format digestible by at least one HD Radio™ interconnect.

Aspects of the inventions also provide the ability for broadcasting command and control information to edge node devices capable of receiving HD Radio™ transmissions.

Aspects of the inventions allow for the conversion of downlink Internet based content to be delivered to interested parties over FM terrestrial Radio spectrum.

Aspects of the invention also provide a system for secure communication of said content.

Aspects of the invention may allow for pay-per-use, pay-per-view, or pay-per broadcast type of services.

Aspects of the invention may enable for the uploading of digital content to a repository from at least one third party organization, including, but not limited to, major record labels with robust in-house video production facilities for in-house recording artist, independent record labels utilizing contracted video crews for production music videos, and independent artists submitting self-produced video content.

Aspects of the invention provide for the ability to add meta data (aka. tagging) to the rich content to enable interactive viewing that can be used for, but not limited to electronic commerce, marketing, product placement, social media or Internet links, advertising, command and control, etc.

Aspects of the present invention provides the ability for a computer system and editing application to add metadata to pre-recorded, live, and/or streaming rich content.

Aspects of the present invention may enable the receiving system to process the meta data to enable command/control and/or interaction with a computer based application associated with the radio receiver.

Aspects of the invention may enable the ability to review of content, thus enabling a user to ensure that it meets at least one of, but not limited to regional, political, governmental standards for broadcast content.

Aspects of the invention in one non-limiting illustrative embodiment provides for the radio receiver to be integrated with a computer system such as but not limited to a Smart phone, iPod, laptop, embedded navigation system, vehicular and non-vehicular infotainment system, computer gaming console, other smart hand-held device, etc.

Aspects of the invention may provide the ability to broadcast emergency information by the dissemination of critical rich content to the receiver systems. In a non-limiting embodiment, metadata can be combined into the rich content by governmental agencies/officials such as, but not limited to, federal, state, county and municipal officials to broadcast emergency information to constituents handheld devices. In this exemplary illustrative embodiment, rich content and meta data can be combined with other services available on the receiving system such as but not limited to Internet communications and sensor devices such as GPS circuitry, accelerometer, video display, etc.

Aspects of the invention provide for system and methods to add meta data to pre-existing content that may be re-broadcast or multicast.

Aspects of the invention provide for system and methods that enable near real-time tagging of live or streaming content that may be broadcast or multicast.

A method for the transmission of rich content data over HD radio frequency modulated signals to a radio receiver that is operatively coupled to at least one computer system for consumption by at least one user, the method comprising: accepting digitally recorded content as input from at least one digital content source; ensuring that the accepted digitally recorded content will fit at least within the bandwidth restrictions of HD radio sideband channels by further compressing said content if necessary; further rendering the said content to add additional meta-data prior to transmission over the HD radio frequency modulated signals that enables the at least one computer system to further interpolate the digitally recorded content; transmitting the further rendered said content to the at least one receiver that is operatively coupled to the at least one computer system; transmitting the said metadata associated with the further rendered content to the at least one computer system; receiving at least a portion of the further rendered content over at least one HD radio sideband channels; receiving the metadata associated with the further rendered content; and the at least one computer system acts upon the additional received metadata while presenting the further rendered rich content that was received over the at least one HD radio sideband channel.

In an aspect of the method, the metadata and the further rendered digital content is received over one HD Radio frequency modulated sideband channel.

In an aspect of the method, the associated rendered metadata is acted upon during the display of the rich digital content, to enable an interactive experience for the at least one user.

In an aspect the additional rendering of content allows for the review of said rich content prior to transmission over the HD Radio sideband channel.

In an aspect of the method, the additional rendering of content allows for the modification of said rich content prior to transmission over the HD Radio sideband channel.

In an aspect of the method, the associated metadata is acted upon by the operatively coupled computer system during the display of the rich digital content, to enable an interactive experience for the user allowing other resources to be access over an internet connection.

In an another aspect a HD Radio frequency modulated radio communications system enables the transmission of digital content data, infrastructure elements comprising: an operatively coupled rich content ingress system; an operatively coupled rich content metadata rendering system; an operatively coupled rich content distribution system; an operatively coupled HD Radio frequency modulated communications system transmission circuity; receiver circuity; and an operatively coupled rich content reception computer system.

In an aspect the system also includes an operatively coupled rich content verification and editing system, In an aspect of the system, the operatively coupled rich content ingress system accepts and processes video content from Internet based content providers.

In an aspect of the system, the operatively coupled rich content ingress system accepts and processes video content from live video feeds captured by at least one video camera.

In an aspect of the system, the operatively coupled rich content ingress system distributes said rich content to an operatively coupled metadata rendering system.

In an aspect of the system, the operatively coupled rich content ingress system distributes said rich content to an operatively coupled content verification and editing system and the operatively coupled content verification system distributes the content to the operatively coupled metadata rendering system.

In an aspect of the system, the operatively coupled rich content metadata rendering system generates additional metadata associated with the rich content that will be communicated to said operatively coupled rich content reception computer system.

In an aspect of the system, the operatively rendering system distributes to the at least one operatively coupled rich content distribution system.

In an aspect of the system, the operatively coupled content distribution system distributes said rich content to the at least one operatively coupled HD radio frequency modulated communications system.

In an aspect of the system the operatively coupled content distribution system distributes said rich content metadata to the at least one operatively coupled rich content reception computer system.

In an aspect of the system, the operatively coupled content distribution system distributes said rich content metadata to the at least one operatively coupled HD radio frequency modulated communications system.

In an aspect of the system, the operatively coupled HD radio frequency modulated communications system distributes said rich content over at least one HD radio frequency modulated sideband channel via its associated transmission circuitry.

In an aspect of the system, the operatively coupled HD radio frequency modulated communications system distributes said metadata associated with said rich content over at least one HD radio frequency modulated sideband channel via its associated transmission circuitry.

In an aspect, the operatively coupled HD radio frequency modulated communications system distributes said metadata associated and said rich content over at least one HD radio frequency modulated sideband channel via its associated transmission circuitry.

In an aspect of the system, the at least one operatively coupled rich content reception computer system processes the said rich content received via its associated receive circuitry and interpolates any received metadata associated with said rich content in presenting the said rich content to a user.

In an aspect of the system, the operatively coupled computer system is at least one: smartphone; handheld tablet; iPod; laptop computer; desktop computer; embedded compute and control system; embedded navigation system; vehicular infotainment system; non-vehicular infotainment system; computer gaming console; or similar device.

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Certain embodiments of the present invention and their advantages may be understood by referring to FIGS. 1-6, wherein like reference numerals refer to like elements, and are describe in the context of a terrestrial FM broadcast system. Nevertheless, the present invention is applicable to alternative embodiments and alternate communication technologies such as described in, but not limited to, Amplitude Modulated HD Radio systems.

Figure 1:
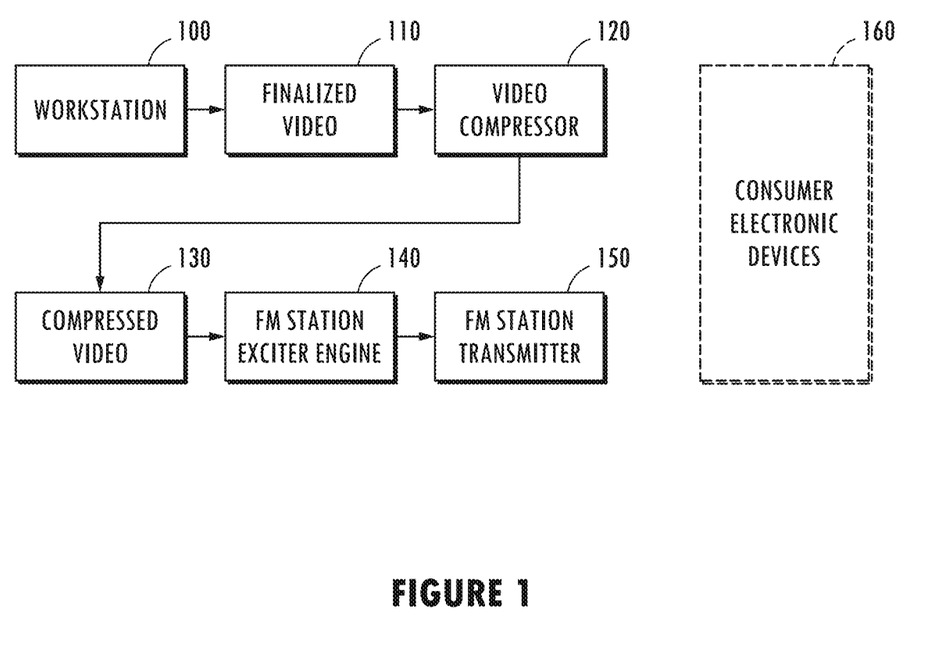
FIG. 1 is a non-limiting illustrative diagram of the logical components used for the broadcast of advanced services and rich content over FM terrestrial broadcast systems.

Focusing on just the broadcasting end of the system, FIG. 1 represents a non-limiting, exemplary illustration of the major components used to generate rich content such as video in a format that can be transmitted over an FM digital broadcast system. In this exemplary embodiment, workstation 100 produces a finalized version of the rendered video content (110). It is to be appreciated that the video content (110) can also include audio information such that the information is synchronized or have the audio generated as a separate stream. Video (110) can also be in a format that has no audio signal, include embedded meta-tags for additional application functionality at the end system, etc. Video (110) is then passed to the video compressor (120) to take the finalized video content (110) and produce a compressed video data stream (130) that can be consumed by the FM station broadcast equipment (140). The FM station broadcast system then takes this data stream and broadcasts it over the assigned frequency via FM station transmitter (150). Ultimately the broadcasted data is received by at least one of the interested devices (160) using a FM digital radio receiver that is tuned to the correct frequency.

Figure 2:
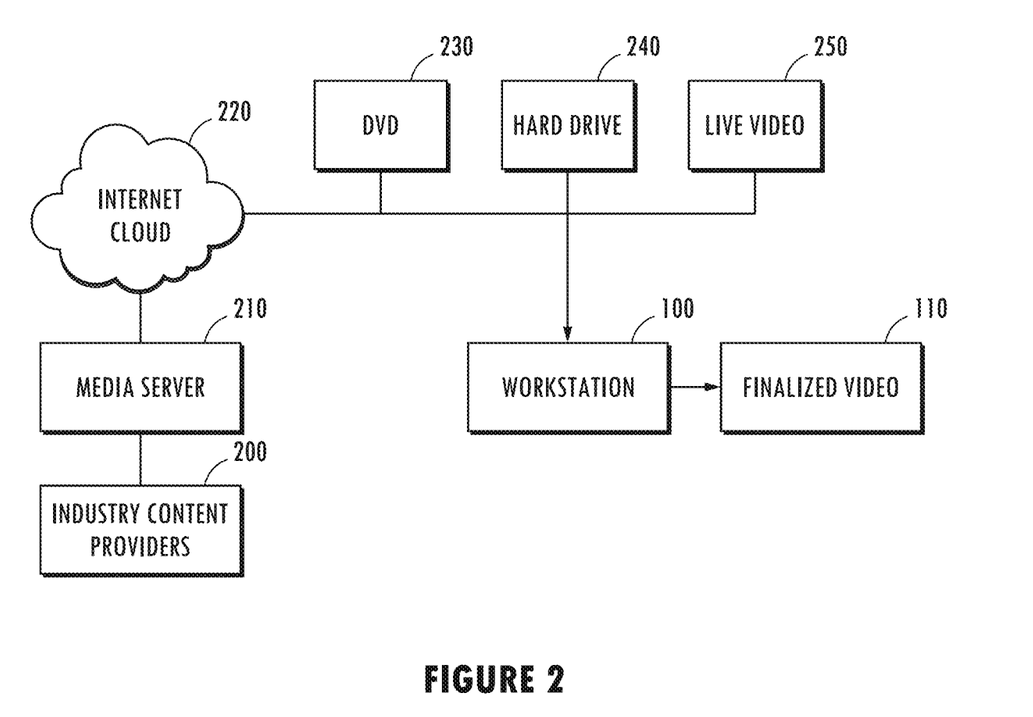
FIG. 2 is a non-limiting illustrative diagram of potential sources of rich content and advanced services that can be transmitted over FM terrestrial broadcast systems.

FIG. 2 is a non-limiting exemplary diagram of potential sources of data to be communicated via the digital FM radio broadcast system depicted in FIG. 1. As shown, sources from digital content may be locally processed from local storage components such as DVD device (230) and hard drive (240). It may also be sourced from a live video feed (250). However content may also be sourced over the internet, as depicted by devices (200) and (210) over network interconnect (220). Industry content providers may include, but not limited to services such as NetFlix, NFL films, a music label, corporate functions that may rent the regional communications channel for broadcast of a company event or advertising, etc., basically any organization that may want to transmit either live or scheduled broadcasts of generated rich content. The content may initially be stored in some locally accessible storage medium for later rendering and broadcast or received as a near real time stream by workstation/server 100 that format the incoming data into the finalized video (110). The finalized video is then processed by the video compressor device (120) and processed by the digital FM broadcast system depicted in FIG. 1.

Figure 3:
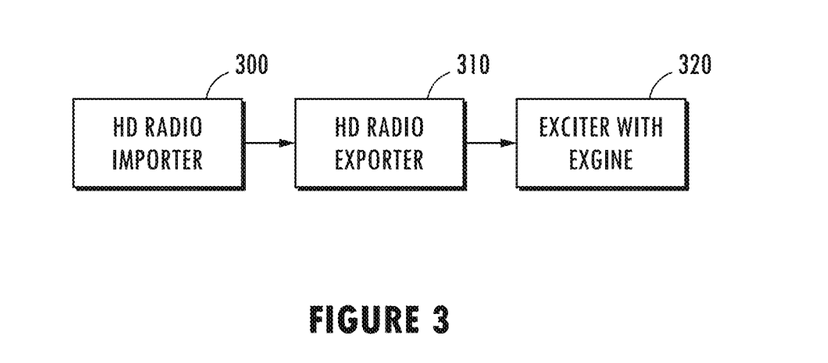
FIG. 3 is a non-limiting illustrative block diagram of the major components of a HD Radio™ broadcast system.

FIG. 3 depicts a non-limiting exemplary embodiment block diagram of an HD Radio™ additional components need to communicate the digital data over the terrestrial FM radio signals. To communicate digital information, an importer function (300), exporter function (310) are added and the FM exciter (320) is upgraded to include additional transmission logic for the broadcast of the digital data.

The importer (300) contains the hardware and software necessary to deliver Advanced Application Services (AAS). The at least one exemplary data service providers (work station 100) use an Application Programming Interface (API) to pass service data to the importer (300) over the service link.

The importer (300) establishes session connections between the at least one service provider (100). Once a session is established, the at least one service provider can pass data over the importer-to-exporter link (I2E), which, in turn, will be broadcast over the air to HD Radio digital receivers.

In addition to the AAS from data service providers, the importer (300) also accepts Supplementary Program Service Audio (SPS) and Program Service Data (PSD). In one exemplary embodiment, the importer (300) multiplexes all of the service provider data, multicast audio and data streams into a full-duplex TCP/IP or bi-directional User Datagram Protocol (UDP) output.

To generate the multiplex over the exporter (310) to Exgine Link (E2X) requires a new element in the system topology. The exporter (310) answered this need by accepting the Main Program Service (MPS) audio and PSD from the automation server at the studio end as well as the multiplexed SPS audio, SPS PSD and AAS data from the importer (300).

The exporter (310) contains the hardware and software necessary to generate the MPS and the Station Information Service (SIS). The MPS provides the main program audio and PSD broadcast over the air to HD Radio receivers. The SIS provides the station information (call sign, absolute time and position correlated to GPS).

The exporter (310) may be visualized as the final multiplexer of MPS and all AAS data prior to developing the simplex UDP stream to the STL.

The exgine (320) subsystem accepts the exporter-to-exgine link (E2X) data from the exciter's host processor and performs the Orthogonal Frequency Division Multiplexing (OFDM) modulation for the digital portion of the HD radio waveform.

The exgine (320) element is comprised of an embedded processor, SDRAM and flash memory and enables the layer 1 modulation to be executed on the Digital Signal Processor (DSP).

The exgine (320) element may be added to many manufacturers digital implementations of their analog exciter offering an integrated solution for low level analog and digital signal generation. In this distributed exemplary embodiment, the HD Radio data stream is fed to the exgine (320) over a simplex UDP Ethernet connection, however other transport mechanism would be apparent to those schooled in the art.

In one exemplary embodiment, the HD Radio™ data stream offers different levels of transport service for the broadcasted information—byte streaming, packet oriented, and/or large object transfer modes of operation. The different modes of operation may be selected based on the type of service required for the reception of the enhanced content.

Figure 4:
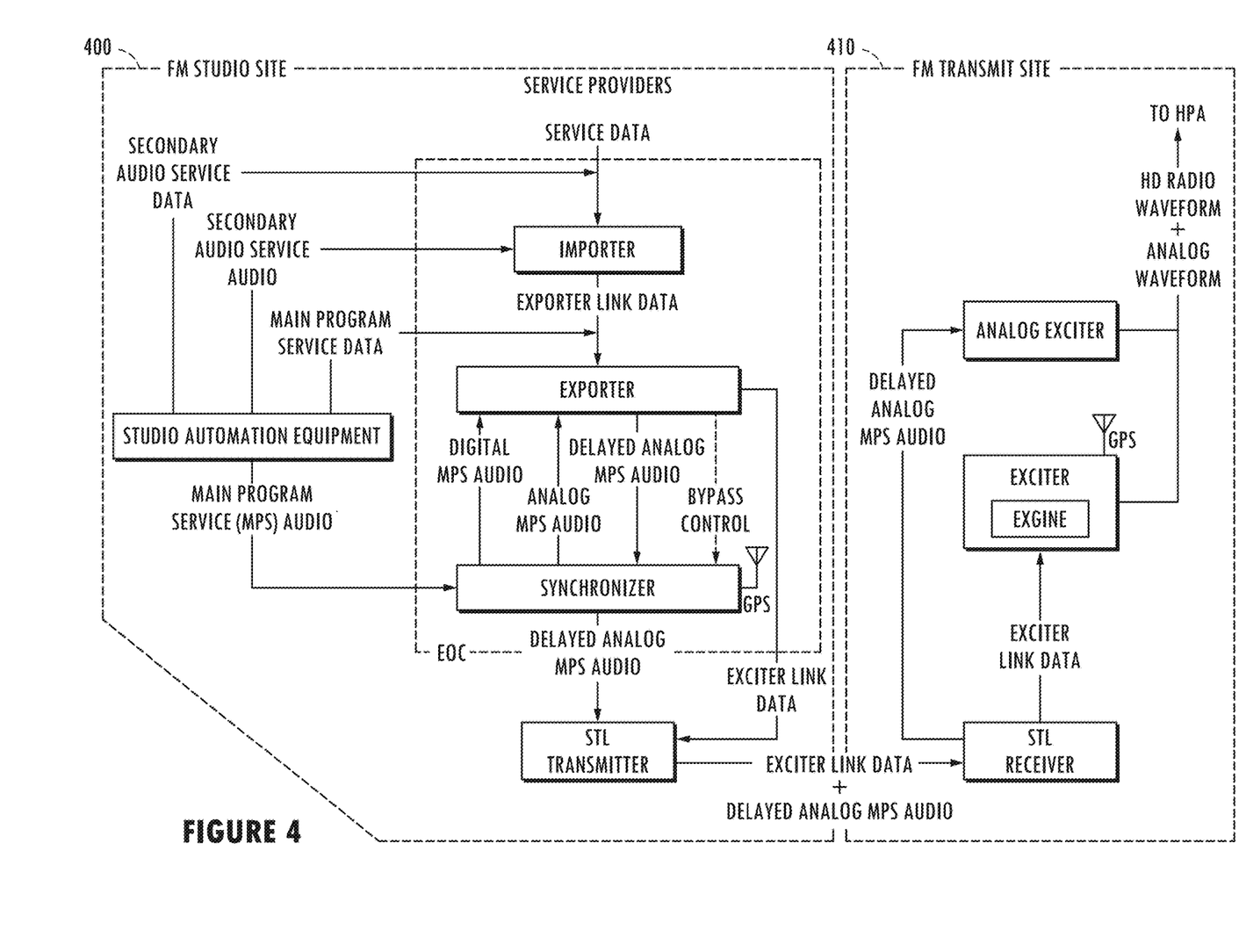
FIG. 4 is a more detailed non-limiting illustrative block diagram of HD Radio™ broadcast system.

FIG. 4 schematically depicts a more detailed exemplary embodiment of the HD Radio™ terrestrial FM broadcast system. The non-limiting exemplary components depicted in FIG. 2 would act as service providers to FM Studio site (400). As previously described these service providers may be geographically disbursed or co-located at the FM studio site. The enhanced content along with any potential audio content would then be rendered by the HD Radio™ subsystem and communicated to the FM transmit site (410). The analog wave along with the HD Radio™ digital signal is then broadcast out to the edge nodes that are appropriately equipped with the correct receiver that is tuned to the specified frequency range(s).

Figure 5:
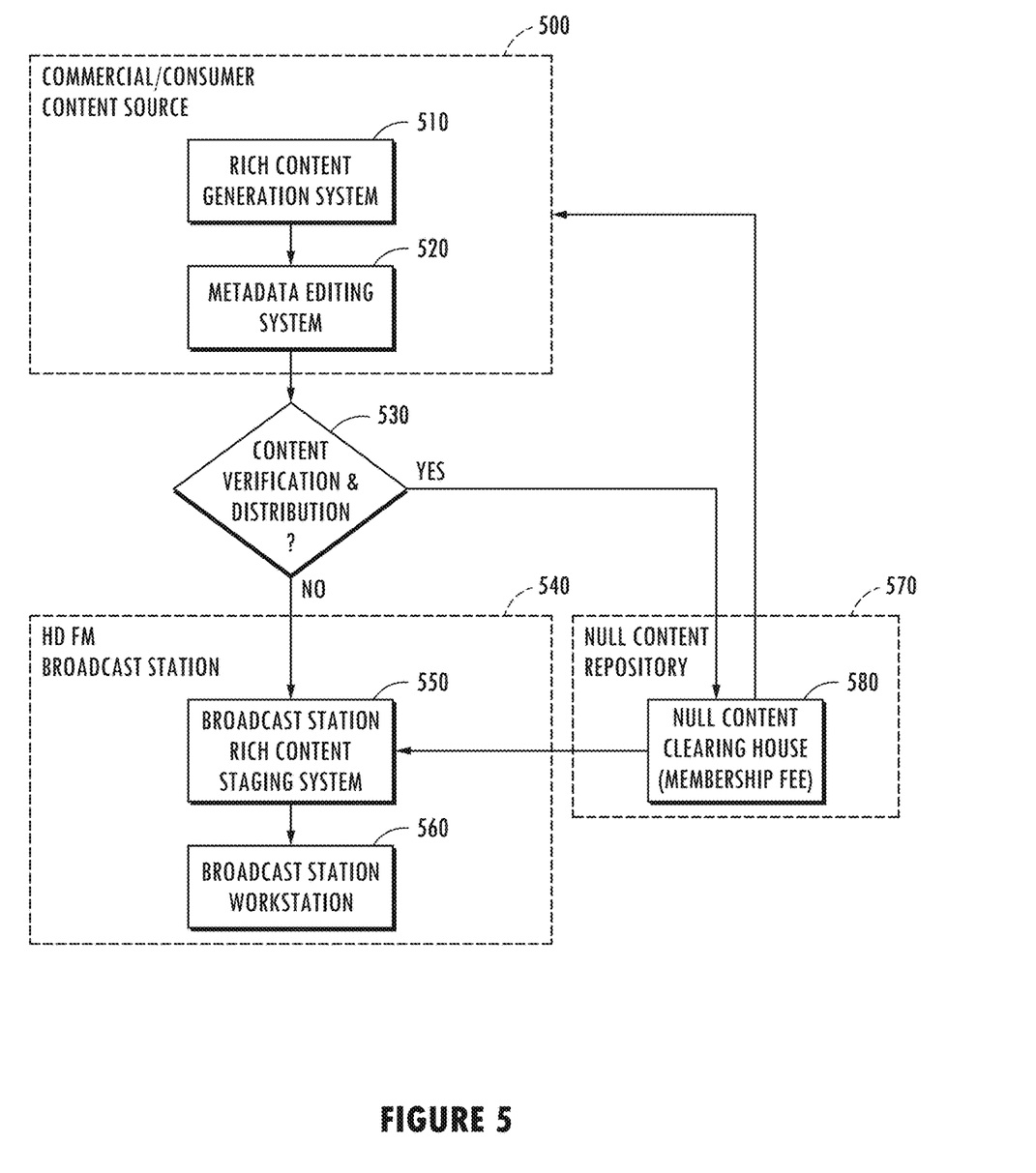
FIG. 5 is a non-limiting illustrative diagram depicting the transference of rich content from at least one third party source with content verification and remote distribution service.

FIG. 5 depicts a non-limiting exemplary illustrative embodiment of a rich content generation workflow with an optional content validation and distribution system. System (500) depicts an exemplary content generation. Block (510) depicts a source of rich content, potentially a HD video camera, or other suitable source of rich content or command and control system. The output of step (510) is passed to an editing system (520) for the addition of metadata. It should also be understood that steps (510) and (520) may combined into a single system and aided by filtering technology such as facial recognition software to automatically mix metadata into the stream without the necessity to edit the output after the fact. The output of step (520) is forwarded to step (530) where a verification and/or distribution decision is made. If no verification, or additional distribution is required, the output of system (500) may be directly passed to the frequency modulated broadcast system (540). System (550) provide the necessary technology to accept the rich content and stage it subsequent transmission over the radio broadcast system (not shown). Element 560 allows for the broadcast station to potentially schedule and/or monitor the radio broadcast of the rich content provide.

If however additional verification or distribution may be required, such as to potentially ensure compliance with regional or governmental regulations, content produced by system (500) may need to be reviewed before broadcast by radio system (540). Based on the content type, it may be passed to step (570) that may be operated by a third party. Clearing house (580) may review content for verification against regional regulations or norms. If the content is acceptable, output of step (580) is passed to system (540) for broadcast over the radio broadcast system. If however, after review, content does not meet the applicable rules and/or guidelines, the content may be returned to system (500) for further editing. Last but not least, system (570) can act as a distribution system, allowing the rich content to be transferred to at least one of a plurality of additional radio broadcast systems (540).

Figure 6:
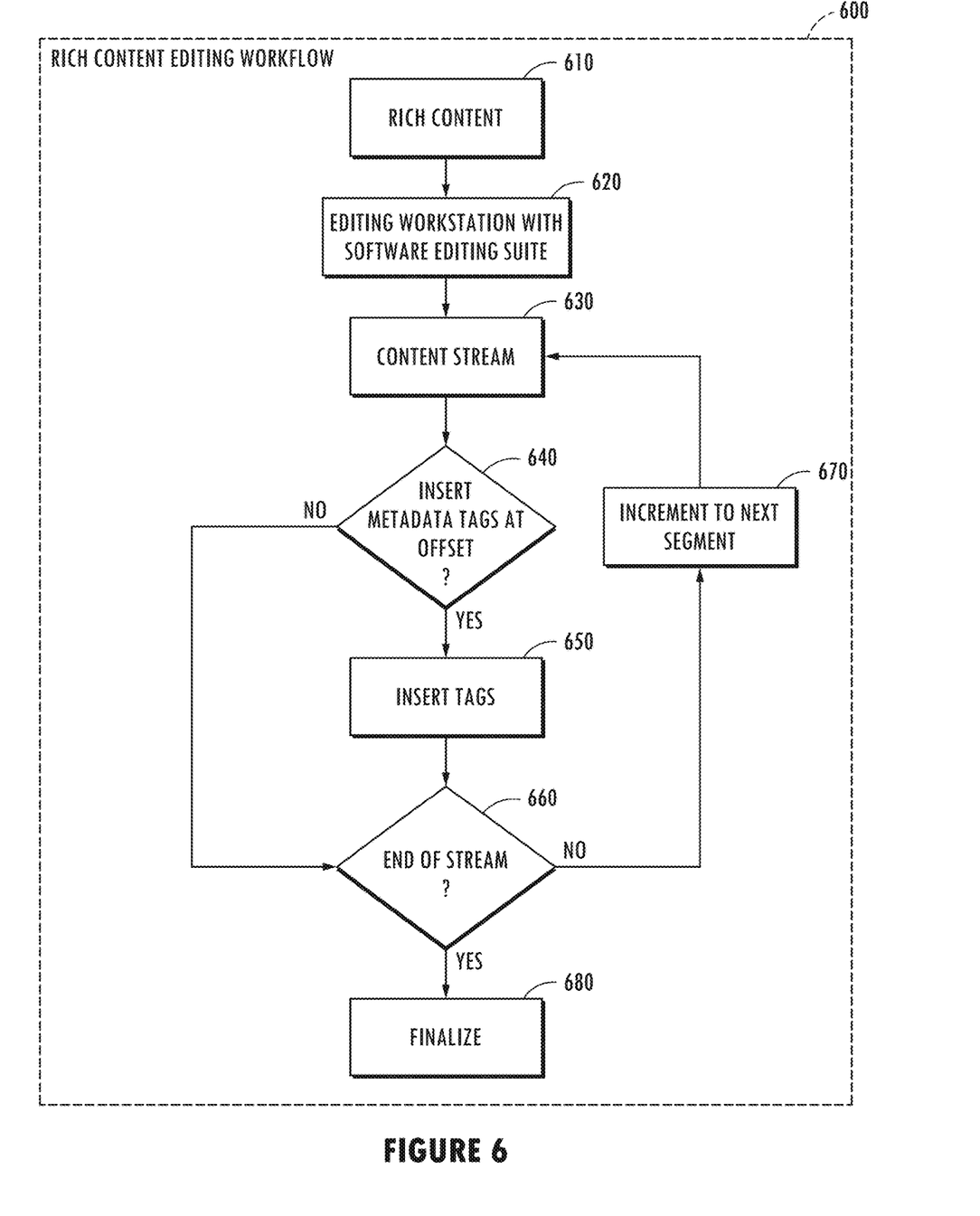
FIG. 6 is a non-limiting illustrative diagram depicting the editing and modification of content and adding of meta-data.

FIG. 6 is a more detailed non-limiting exemplary block diagram of a content rendering system that enables the embedding or the associating of metadata with a rich content stream. System (600)'s workflow begins with an illustrative rich content source (610). The rich content may pass through an initial editing processed depicted by step (620). The potentially edited content stream (630) is then readied for the insert or association of metadata at step (640). If a metadata tag is to be associated or inserted at the current offset, the metadata is recorded at step (650). For video content may be done on a frame-by-frame basis, or may be based on an offset within the stream (630). As such, this may also be an iterative process where different metadata may be associated with different offsets within stream (630). If no metadata is to be attached, control is passed to step (660) where a check to see if the end of stream has been reached. If end of stream has not been reached, control is passed to step (670) for further processing of content stream (630). If the end of stream is reach, control is passed to step (680) where the stream is finalized and them either stored for later broadcast, or if near real time content, may be passed to system (540) or (570) as described above. It will be understood by those schooled in art, that the steps outlined for system (600) may occur in a different order, for instance, where the metadata may be added by editing system (620) or by the device providing rich content (610).

It will be readily understood by those schooled in the art that the present invention enables additional advantages that may be realized by an organization or customer, as they can now avail themselves of the additional, potentially free to the consumer, digital bandwidth, providing them access to solutions not previously available with increased economies of scale. Without these advantages set forth, the total cost of replicating these services by the customer or organization may be cost prohibitive, potentially putting an organization or customer at a competitive disadvantage.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein.

The invention can be embodied in other specific forms without departing from its spirit or essential attributes.

What is claimed is:

1. A method for the transmission of emergency information in the form of rich content data over HD radio frequency modulated signals to a radio receiver that is operatively coupled to at least one computer system for consumption by at least one user, the method comprising:
   accepting digitally recorded emergency information content as input from at least one digital content source of a governmental agency;
   ensuring that the accepted digitally recorded emergency information content will fit at least within the bandwidth restrictions of HD radio sideband channels by further compressing said content if necessary;
   further rendering the said emergency information content to add additional meta-data prior to transmission over the HD radio frequency modulated signals that enables the at least one computer system to further interpolate the digitally recorded emergency information content;
   transmitting the further rendered said emergency information content to the at least one receiver that is operatively coupled to the at least one computer system;
   transmitting the said metadata associated with the further rendered emergency information content to the at least one computer system;
   receiving at least a portion of the further rendered emergency information content over at least one HD radio sideband channels;
   receiving the metadata associated with the further rendered emergency information content; and
   the at least one computer system acts upon the additional received metadata while presenting the emergency information within the further rendered rich content that was received over the at least one HD radio sideband channel.

2. The method of claim 1, wherein the said metadata and the further rendered digital content is received over one HD radio frequency modulated sideband channel.

3. The method of claim 1, wherein the associated rendered metadata is acted upon during the display of the rich digital content, to enable an interactive experience for the at least one user.

4. The method of claim 3, wherein the said metadata and the further rendered digital content is received over one HD radio frequency modulated sideband channel.

5. The method of claim 1, wherein the additional rendering of content allows for the review of said rich content prior to transmission over the HD radio sideband channel.

6. The method of claim 1, wherein the additional rendering of content allows for modification of said rich content prior to transmission over the HD radio sideband channel.

* * * * *